(12) United States Patent
Fritz

(10) Patent No.: US 6,748,841 B1
(45) Date of Patent: Jun. 15, 2004

(54) RAILROAD HOPPER CAR GATE OPERATING SYSTEM

(75) Inventor: Kenneth D. Fritz, Monticello, MN (US)

(73) Assignee: Calbrandt, Inc., Delano, MN (US)

( * ) Notice: Subject to any disclaimer, the term of this patent is extended or adjusted under 35 U.S.C. 154(b) by 0 days.

(21) Appl. No.: 10/320,043

(22) Filed: Dec. 16, 2002

(51) Int. Cl.⁷ .............................................. B25B 13/00
(52) U.S. Cl. ........................ 87/57.41; 81/57.34; 269/20; 269/27
(58) Field of Search .......................... 81/57.41, 57.34, 81/57.16, 57.18, 57.19, 57.2, 57.33; 269/26, 24, 27, 289 MR

(56) References Cited

U.S. PATENT DOCUMENTS

| | | | |
|---|---|---|---|
| 4,342,267 A | 8/1982 | Blout | |
| 4,450,773 A | 5/1984 | Fritz et al. | |
| 4,601,244 A | 7/1986 | Fischer | |
| 5,351,582 A | * 10/1994 | Snyder et al. | 81/57.17 |
| 5,868,045 A | * 2/1999 | Hauk | 81/57.34 |
| 6,116,118 A | * 9/2000 | Wesch, Jr. | 81/57.34 |
| 6,138,529 A | * 10/2000 | Pietras | 81/57.33 |
| 6,363,863 B1 | 4/2002 | Dohr | |
| 6,431,029 B1 | * 8/2002 | Hawkins, III | 81/57.25 |
| 6,431,084 B1 | 8/2002 | Gaydos | |

* cited by examiner

Primary Examiner—Lee D. Wilson
(74) Attorney, Agent, or Firm—Nikolai & Mersereau, P.A.; C. G. Mersereau

(57) ABSTRACT

A mechanized device for externally grabbing and rotating the operating capstan of a railroad car bottom discharge gate is disclosed which utilizes a pair of spaced converging, opposed normally open gripper fingers operable between a closed and an open position, operated between a closed and an open position by a reciprocating fluid cylinder and a motor for rotating the gripper mechanism relative to the cylinder to thereby rotate the capstan to operate the gate.

10 Claims, 5 Drawing Sheets

RAILROAD HOPPER CAR GATE OPERATING SYSTEM

BACKGROUND OF THE INVENTION

I. Field of the Invention

The present invention relates to railroad cars having bottom discharge hopper-type bodies in which the hoppers are closed by horizontally disposed gates that are displaced laterally to open and close by drive systems that include a rack and pinion drive mechanism operated by rotating an associated operating rod using attached capstans. More particularly, the invention relates to a mechanism for externally gripping and rotating the handles or capstans of operating rods of such systems.

II. Related Art

A railroad car hopper discharge unit typically attaches to the bottom of a railroad car hopper and includes straight sidewalls and sloping end walls which terminate in horizontally directed flanges which, in turn, define a rectangular outlet opening. Provision is made for the attachment of gate assemblies for each of the hoppers of a railcar for selective discharge of commodities contained in the car body. The sliding gate discharge system includes a gate that is moved between fully open and fully closed positions by the operation of a rack and pinion system operated by rotating a shaft or operating rod connected to rotate one or more pinion gears, to thereby laterally displace an associated rack and with it the associated gate. Typical systems of the class described are shown in U.S. Pat. Nos. 4,450,773; 4,342,267; and 6,363,863.

The gate is operated by a drive mechanism that includes an elongated operating rod which carries one or more pinion gears and which is supported by the frame of the gate assembly, the rotation about its axis which is fixed relative to the gate assembly frame. The rack and pinion, of course, converts the rotary movement of the operating shaft into linear fore and aft movement to operate the hopper gate. Each operating rod extends laterally outward beyond the gate operating assembly and is provided with an operating handle or capstan at one or both ends fixed to the operating rod. Each capstan is provided with shaped outward directed recess adapted to receive a mechanized operating tool adapted to address the handle from track side and rotate the operating shaft utilizing the shaft handle to open and close the gate mechanism.

One particularly prevalent and undesirable problem with such systems has to do with internal wear to the rod handles or capstans themselves. Because debris can accumulate in the rack and pinion systems and because of the generally heavy nature of the equipment, it is often difficult to rotate the operating shafts, particularly in the case of opening gates of loaded cars. Repeated torque often causes the initially square operating recess openings in the capstans (see FIG. 2) to become rounded such that corresponding conventional square shaped mechanized tools are no longer able to operate the gate mechanisms. The operating rods must be operated manually by using bars to address side openings or the capstans must be replaced. Thus, there remains a definite need for an improved system for rotating the operating rods of discharge gate systems of the kind described which prevents eventual stripping of the keyway or other such problems.

SUMMARY OF THE INVENTION

By means of the present invention, there is provided a tool for rotating capstans associated with the operating shafts of railroad car discharge gate mechanisms which avoids problems associated with previous devices. The mechanized device of the present invention includes a compact hydraulic gripper mechanism that grabs the outside of the capstan to insure positive rotation without the need for keying a tool into a shaped opening in the laterally directed end of a capstan. The mechanical system of the invention includes a cylinder-operated gripper having a plurality, preferably a pair of spaced, converging, opposed gripping fingers with teeth that converge to grab the outside of the capstan and thereafter the gripper rotates to operate the gate mechanism. The gripper is mounted from one end of a gripping shaft having a hollow or recess at the other end to receive a piston rod associated with a fluid cylinder as an extension of the cylinder rod. The end of the gripper shaft is preferably fixed to the cylinder rod so that both rotate together. The gripper shaft is further mounted within and keyed to a gripper shaft sleeve member mounted within and keyed to rotate with the hollow shaft of a low speed, high-torque hydraulic motor which is used to rotate the gripper and piston relative to the cylinder and which presents a highly efficient compact design.

Spaced gripper default rollers are mounted on a base plate behind respective gripper fingers flanking the gripper shaft such that retraction of the piston rod of the fluid cylinder causes the default rollers to force the gripper fingers to close and extension of the cylinder rod allows them to open. Tension members are provided to hold the gripper fingers open against the default rollers in a normally open posture.

The gripper fingers are designed to enclose any sized capstan from any angle and, of course, have the ability to rotate the capstan in either direction to thereby open or close the discharge gate as desired. In this manner, the reciprocal action of the gripper cylinder opens and closes the gripper fingers and the rotation of the hydraulic motor enables the gripper to rotate a captured device.

The system can also be stopped at any point to enable the partial opening of the discharge gate. The tool assembly is adapted to be mounted on a conventional dolly associated with prior capstan rotating tool systems. The dolly is designed to operate parallel to the railcars along the side of the track located in a grain terminal or other unloading station and includes an extendable platform to move the gripping mechanism laterally to approach a capstan of interest.

BRIEF DESCRIPTION OF THE DRAWINGS

In the drawings, wherein like numerals designate like parts throughout the same:

FIG. 7b is a sectional view taken along lines B—B in FIG. 7a.

DETAILED DESCRIPTION

Figure 1:
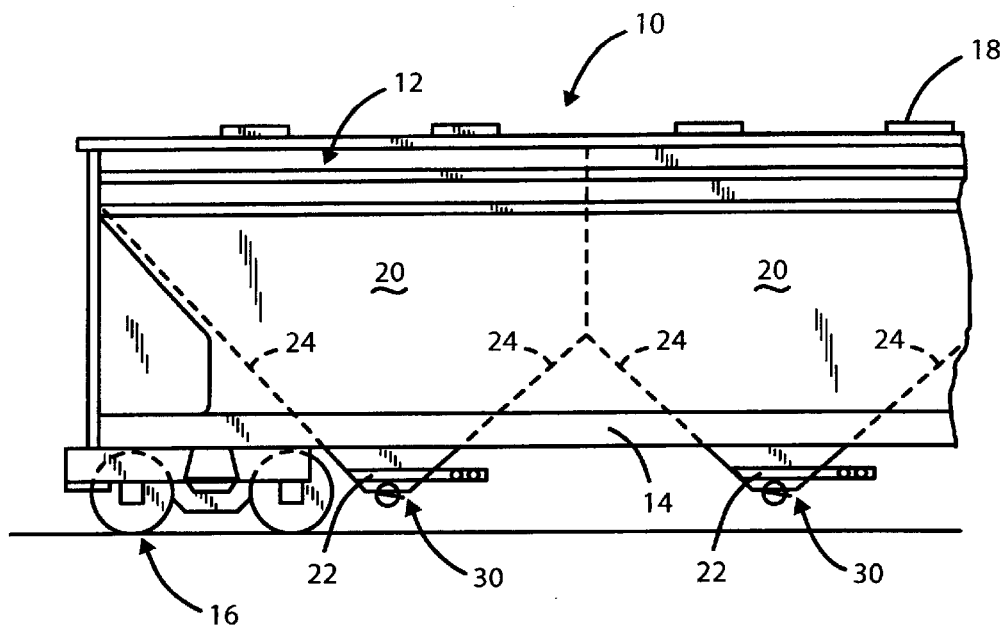
FIG. 1 is a side elevational view of a fragment of a railroad hopper car equipped with gate assemblies operable by the tool mechanism of the present invention.
Figure 2:
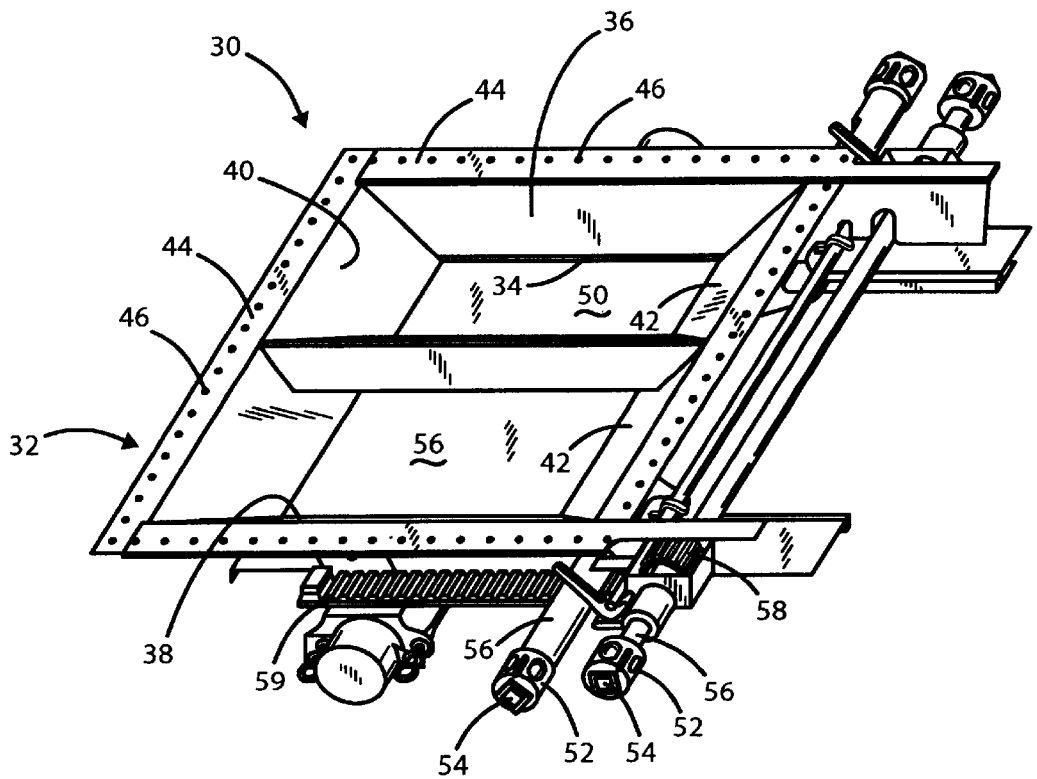
FIG. 2 is an enlarged perspective view of a typical gate assembly showing the operating shafts and handles.

A fragmentary view of a typical railroad car of the class having a hopper-type body is illustrated in FIGS. 1 and 2 of the drawings and includes a gate operating mechanism suitable for use with the gate operating system of the invention. A fragmentary portion of the car generally is identified by the reference character 10 and features a multi-walled enclosure 12 supported on an under frame 14 which extends over the length of the car 10 and, in turn, is supported on a pair of spaced under carriage wheeled trucks located toward the ends thereof, one of which is shown at 16 in FIG. 1. The car is further provided with top loading hatches as at 18 which enable loading of a plurality of internal hopper containers 20 outlined by the broken lines 24 which further define forward and rearward directed slope plates which generally extend the full width of the car 10 and direct or funnel material toward a bottom opening closed by gate systems, generally at 22.

Hopper cars of the class are generally used to transport finely divided particulate materials that readily flow by gravity from open or partially open hoppers 20 as controlled by gate 22. Typical materials include grains, flour, sugar, etc.

FIG. 2 depicts a gate assembly arranged for use in combination with each lower hopper opening and generally designated by reference character 30. Each gate assembly 30 is provided with a rigid frame 32 which defines a discharge opening 34 and includes opposed generally parallel sidewalls 36, 38 extending in a direction lengthwise of the car and opposed, generally parallel walls 40, 42 extending in a transverse direction joining the corresponding end walls to define a generally rectangular discharge opening 34 at the bottom of a generally trapezoidal box having steeply angled walls to further promote full discharge of contained material. The side and end walls are further provided with heavy mounting flanges 44 which match corresponding flanges on the underside of car 10 (not shown). The gate assembly bolts to the car in conventional fashion using a plurality of bolt holes 46. The gate assembly 30 also includes a gate member 50. Capstans are shown at 52, with keyed openings at 54, attached to shafts as at 56. A pinion gear is shown at 58 and an associated rack at 59.

The mechanized capstan gripper device of the invention is depicted best in FIGS. 5, 6, 7a and 7b and is generally represented by the reference character 60. The system includes a hydraulic drive motor 62 which has a hollow shaft 64 and includes a mounting plate 66. The motor is preferably a high-torque, low-speed motor such as an HMS 200 Series motor available from Dynex/Rivett, Inc. of Pewaukee, Wis., or equivalent. Hydraulic cylinder 68 is mounted to the mounting plate 66 and includes a body or blind end 70 and a cylinder rod 72 which is provided with a cylinder rod extension or gripper shaft 74, which has a hollow or recessed end portion 75 which receives the end of the cylinder rod 72. The hollow portion of the gripper shaft 74 and the free end of cylinder rod 72 are preferably threaded and fixed to each other via the thread. The gripper may also be instructed to rotate independent of the cylinder rod, however.

The gripper mechanism includes a plurality, normally a pair of converging opposed normally-open gripping fingers 76, 78, each having a plurality of spaced teeth 80, 82, respectively. The gripper fingers 76, 78 are fastened to a common gripper knuckle 84 in spaced relation journaled on corresponding gripper roller pins 86 which allow the fingers 76, 78 to open and close as will be explained. The gripper knuckle 84 is fixed to rod extension member 74.

A plurality, here a pair of spaced default rollers 88 are mounted between a pair of corresponding finger stands 90. The finger stands 90 are, in turn, carried fixed to a gripper arm base plate 92 which, in turn, is carried by and rotates with a gripper shaft sleeve 94 which is mounted to rotate with the operation of the hollow shaft motor thereby also rotating the gripper device. The rollers 86 are journaled in gripper roller pins 95 so that they also freely rotate. Side plates are shown at 97. Tension members illustrated as springs at 96, but which may, in fact, be any suitable tensioning devices are provided to hold the jaws or gripping fingers 76, 78 in a normally open position when the gripper rod is extended. These tension members are shown as being connected between the gripping fingers 76, 78 and the gripper arm baseplate 92 to urge the fingers against the default rollers 86 and allow the extension and retraction of the cylinder rod to control the opening and closing of the fingers. In this manner, when the piston rod 72 and extension 74 are advanced or extended, the fingers will open and when the rods are retracted, the default rollers 86 will overcome the force of the tension springs 96 and cause the fingers to close or converge about a desired object to be captured.

Figure 3:
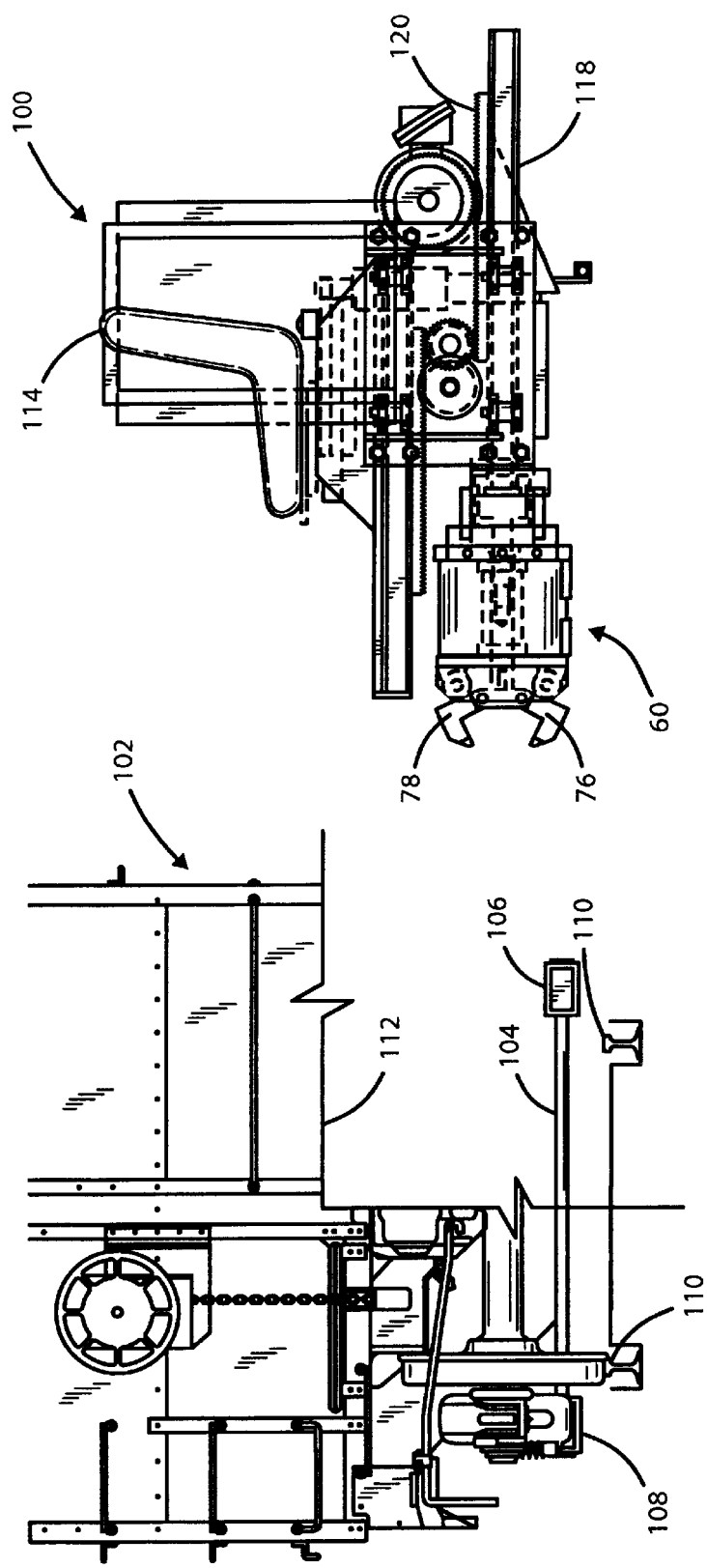
FIG. 3a is an end view of a railroad car with parts cut away showing a operating rod and handle or capstan for a hopper discharge gate operating system.
FIG. 3b is a side framentary view with ports cut away of a dolly and gate operating mechanism in accordance with the invention.

FIGS. 3a and 3b illustrate the gripper tool assembly 60 mounted on a mechanized dolly 100 which is capable of moving along and adjacent to a railroad track, the rails of which are illustrated at 110 in FIG. 3a, parallel to the lengthwise direction of a railroad car, such as shown in the fragmentary drawing of FIG. 3a at 102. Items of interest also illustrated on the railroad car include a reciprocally operating platform 104 which can be advanced or retracted to adjust the relative lateral position of the gripper in relation to the capstan and associated capstan members 106 and 108. The car is cutaway at 112 to expose the capstan member 106 more clearly.

The dolly 100 is conventional and is provided with an operator seat at 114 and suitable controls (not shown) fully operable by someone seated in the seat 114. The capstan gripper mechanism is also mounted on an extendable member 118 which enables the entire gripper mechanism to be advanced toward the capstan 106.

Figure 4:
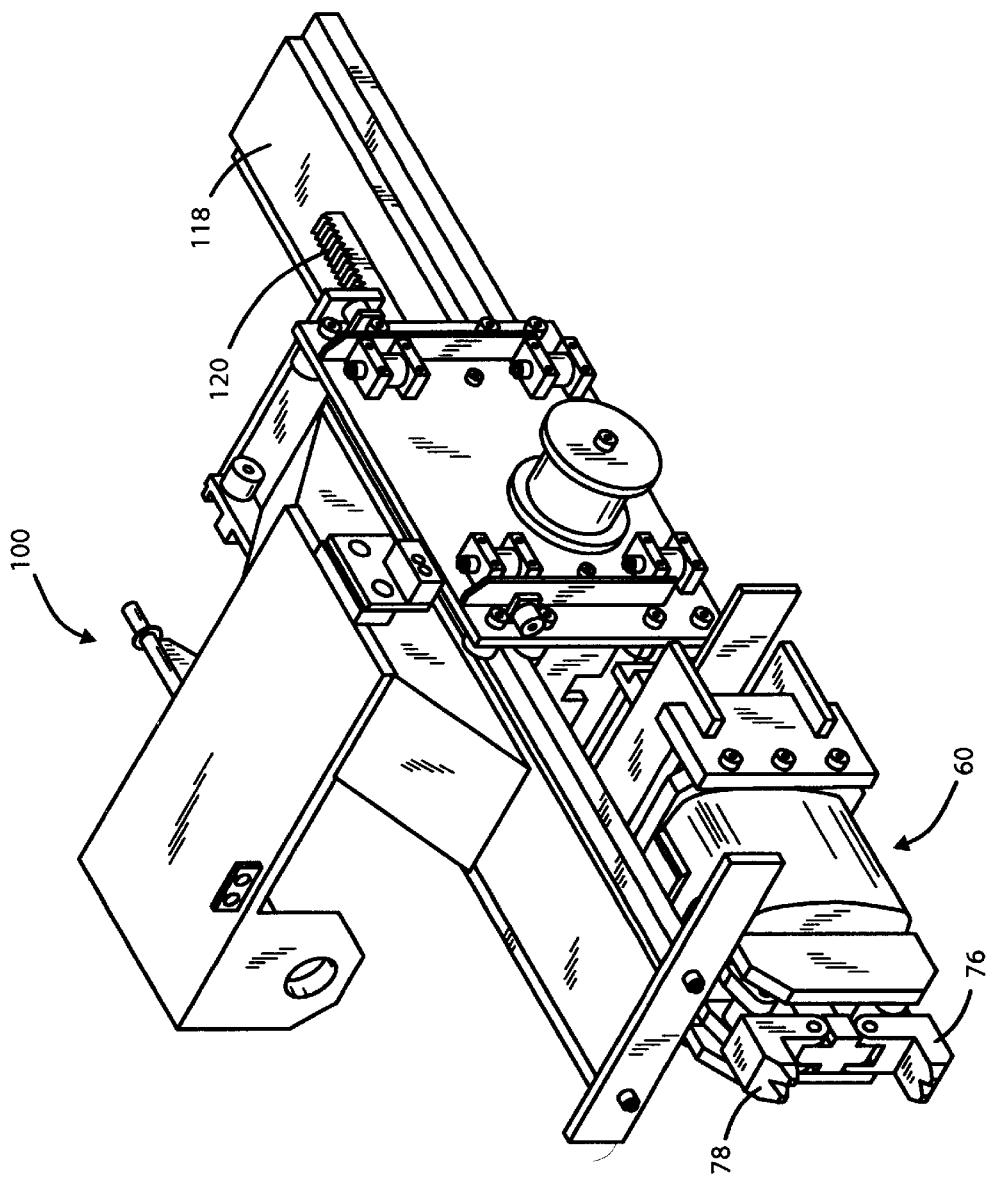
FIG. 4 is a perspective view of a dolly including the operating tool mechanism of the invention mounted on the dolly.
Figure 6:
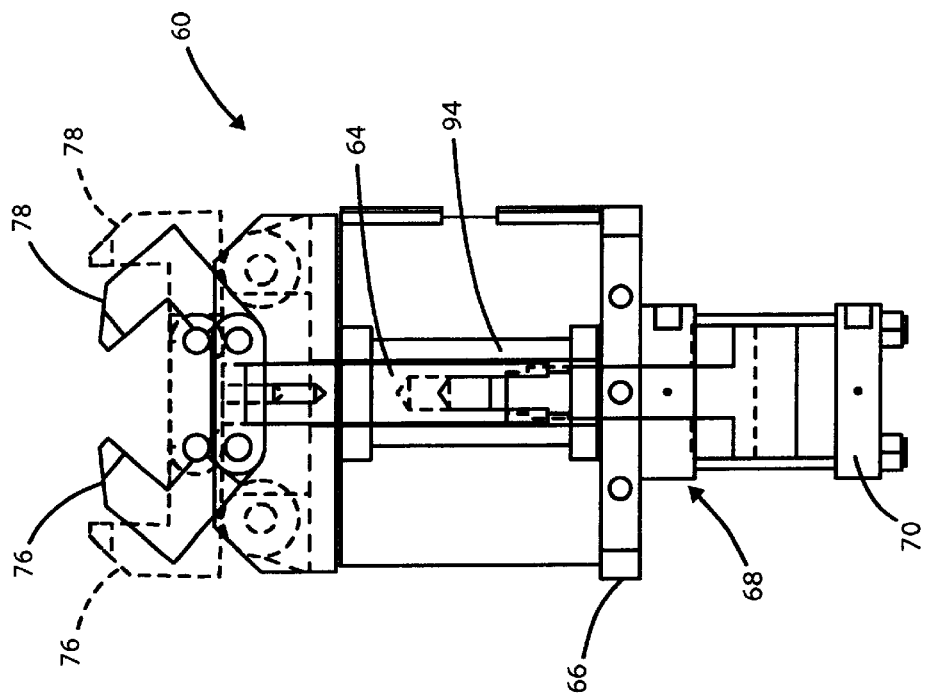
FIG. 6 is a side view of the gripper system as shown in FIG. 5 with parts cut away showing some of the internal parts of the gripper system with the cylinder rod shown both in an extended and partially retracted position.
Figure 5:
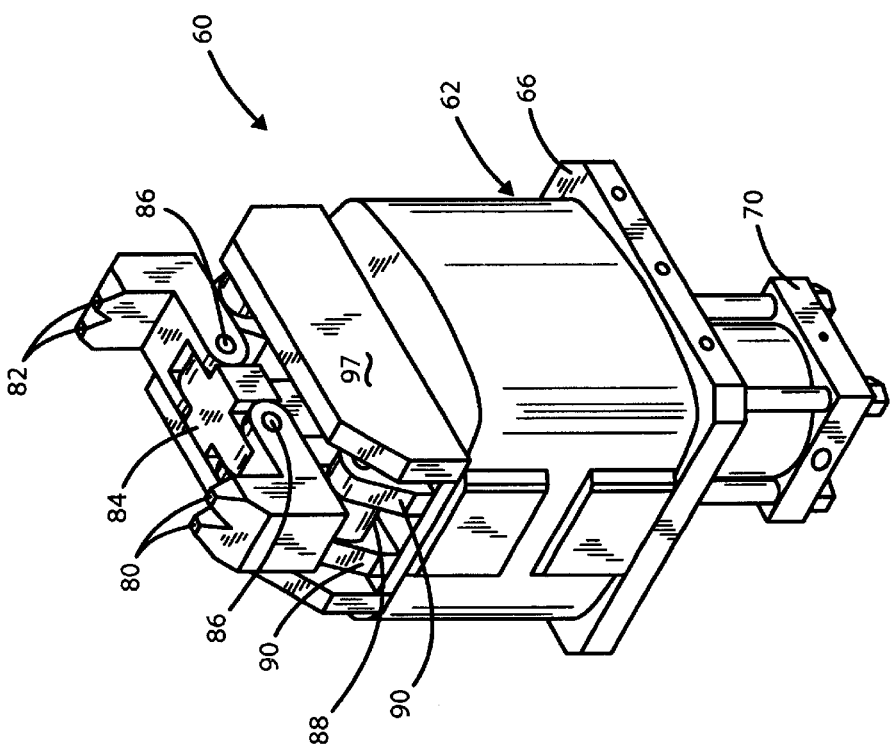
FIG. 5 is a perspective view of the gripper system of the operating tool mechanism of the invention.
Figure 7B:
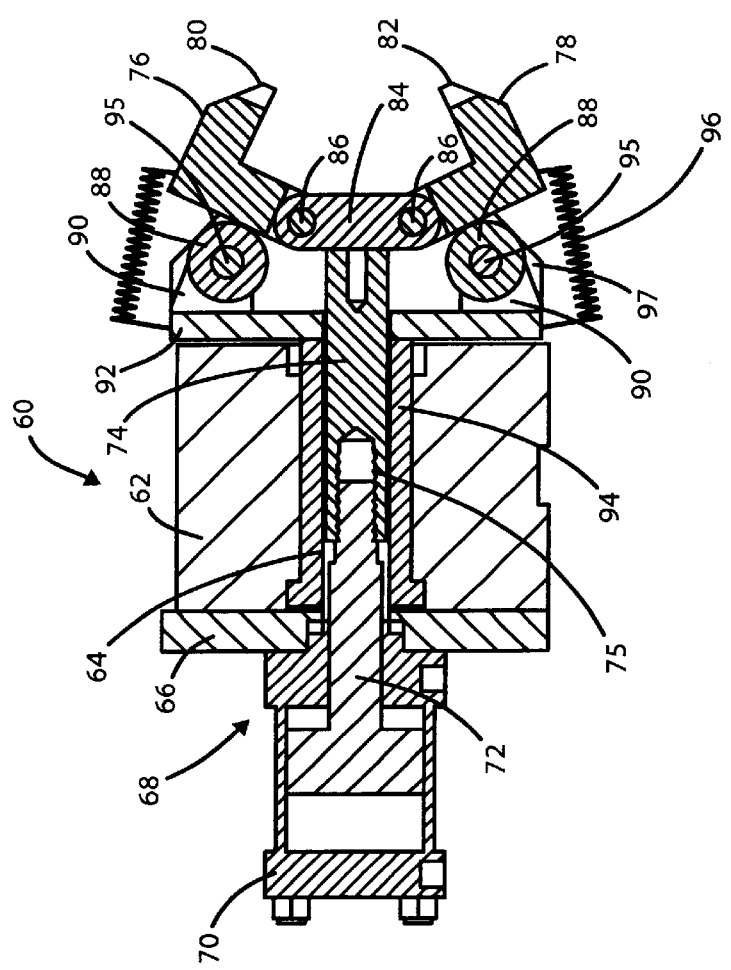
Figure 7A:
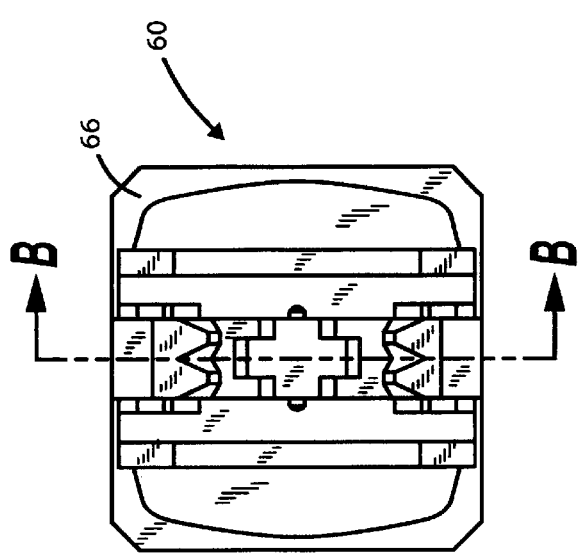
FIG. 7a is a front view of the gripper system of FIGS. 5 and 6.

FIG. 4 depicts a perspective view of a dolly similar to that shown in FIG. 3b generally at 100 for carrying a gripper system 60 in accordance with the invention. The dolly includes a platform 104 which can be advanced and retracted using a rack and pinion system, the rack of which is shown at 120. In this manner, the gripper system 60 can be advanced toward a capstan to be grabbed and rotated and thereafter opened and retracted to clear the railroad car. Such devices are well known and may be made capable of moving alongside a railcar to address a plurality of gates sequentially.

The system is operated by positioning the dolly 100 laterally opposite the operating rod and capstan of a hopper gate assembly of interest. At this time, the rod 72 of the cylinder 68 is in the fully extended position and the gripper fingers are in the fully opened position. The platform 104 is then advanced causing the open fingers 76, 78 of the gripper mechanism 60 to approach the capstan and operating rod of interest. After the fingers 76, 78 have reached the capstan, they are caused to close about the outer periphery of the capstan by retraction of the rod 72 and cylinder 68 until the capstan is grabbed or gripped tightly between the fingers. It will be appreciated that the gripper fingers can be in any radial position and still capture the capstan externally in a positive manner. Once the fingers have closed about the capstan, the low-speed, high-torque gripper drive motor may be energized and caused to rotate in either direction to rotate the capstan as at 106 and attached rod to operate the corresponding pinions of the rack and pinion gate drive to open or shut a hopper discharge gate.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A mechanized device for externally grabbing and rotating the operating capstan of a railroad car hopper bottom discharge gate, comprising:
    (a) a gripper mechanism including,
        (1) a plurality of spaced converging, normally-open gripper fingers operable between a closed and an open position, said opposed fingers being journal mounted to a common knuckle carried by a reciprocating gripper shaft member;
        (2) a plurality of spaced default roller devices flanking said gripper shaft member and fixed relative thereto such that retraction of said gripper shaft member causes said roller devices to force convergence of said gripper fingers to securely grab an object therebetween;
    (b) a double-acting, stationary fluid cylinder for reciprocally operating said reciprocating gripper or rod member to open and close said opposed gripper fingers; and
    (c) a motor for rotating said gripper mechanism relative to said cylinder thereby causing said gripper mechanism to rotate a grabbed object.

2. A mechanized device as in claim 1 wherein said gripper mechanism includes a pair of opposed gripper fingers and a pair of default rollers.

3. A mechanized device as in claim 2 wherein said motor is a hydraulic motor having a hollow shaft and said gripper mechanism includes a sleeve-shaped gripper shaft mounted in said hollow shaft of said hydraulic motor.

4. A mechanized device as in claim 3 wherein said fluid cylinder is a hydraulic cylinder having a cylinder rod and wherein said gripper shaft is an extension of said cylinder rod.

5. A mechanized device as in claim 2 wherein said fluid cylinder is a hydraulic cylinder having a cylinder rod and wherein said gripper shaft is attached as an extension of said cylinder rod.

6. A mechanized device as in claim 5 wherein said cylinder rod is fixed to said rod extension.

7. A mechanized device as in claim 1 wherein said motor is a hydraulic motor having a hollow shaft and said gripper mechanism includes a sleeve-shaped gripper shaft mounted in said hollow shaft of said hydraulic motor.

8. A mechanized device as in claim 7 wherein said fluid cylinder is a hydraulic cylinder having a cylinder rod and wherein said gripper shaft is an extension of said cylinder rod.

9. A mechanized device as in claim 1 wherein said fluid cylinder is a hydraulic cylinder having a cylinder rod and wherein said gripper shaft is attached as an extension of said cylinder rod.

10. A mechanized device as in claim 9 wherein said cylinder rod is fixed to said rod extension.

\* \* \* \* \*